3,527,871
METHOD OF TREATING ARRHYTHMIA
Edward L. Engelhardt, Gwynedd Valley, and Mary Lou Torchiana, Ambler, Pa., assignors to Merck & Co., Inc., Rahway, N.J., a corporation of New Jersey
No Drawing. Filed Jan. 30, 1968, Ser. No. 701,544
Int. Cl. A61k 27/00
U.S. Cl. 424—330            11 Claims

ABSTRACT OF THE DISCLOSURE

This invention relates to a method of treating or preventing cardiac arrhythmias by administering to the affected patient a safe but effective amount of a dibenzocycloheptene compound having an aminomethyl, an alkylaminomethyl, or a dialkylaminomethyl substituent at the 5-position.

---

The present invention is concerned with a method of treating or preventing arrhythmia in animals.

More specifically, it relates to a method for preventing or modifying existing cardiac arrhythmias by administration to the affected animal of a safe but effective amount of an aminomethyl dibenzocycloheptene compound or a derivative in which one or more of the hydrogens of the dibenzocycloheptene nucleus are replaced by another substituent.

In accordance with the present invention cardiac arrhythmias are prevented or modified in animals, especially mammals, for example horses, dogs and cattle, or man, by the oral or parenteral administration of an effective and nontoxic amount of a compound having the formula

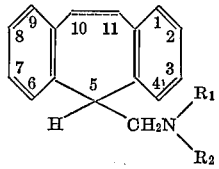

wherein $R_1$ and $R_2$ are hydrogen or lower alkyl or a derivative thereof in which one or more of the hydrogen atoms attached to the 1, 2, 3, 4, 6, 7, 8, or 9 positions is substituted by halogen (fluorine, chlorine, bromine or iodine), alkyl (preferably having from 1–6 carbon atoms), a perfluoroalkyl substituent having from 1–4 carbon atoms, phenyl, alkylsulfonyl (preferably having from 1–5 carbon atoms), alkylmercapto (preferably having from 1–5 carbon atoms), or dialkylsulfamoyl (preferably having from 1–4 carbon atoms). The basic nucleus may contain either a single or a double bond joining the 10 and 11 carbon atoms. This is indicated in the above formula by the dotted line joining the 10 and 11 carbons. In the unsaturated series, one of the hydrogens at the 10 or 11 positions can be replaced by chlorine or bromine.

Also included among the compounds useful in the method of our invention are the N-oxides of the tertiary amines and the nontoxic pharmaceutically acceptable salts of the amines and N-oxides, the preferred salts being the nontoxic acid addition salts such as the hydrochloride, the maleate, and the like.

Illustrative examples of the compounds useful in the method of treatment of our invention are 5-(methylaminomethyl)-5H-dibenzo[a,d]cycloheptene,
10,11-dihydro-5-(methylaminomethyl)-5H-dibenzo [a,d]cycloheptene,
5-(aminomethyl)-5H-dibenzo[a,d]cycloheptene,
5-(aminomethyl)-10,11-dihydro-5H-dibenzo [a,d]cycloheptene,
5-(dimethylaminomethyl)-5H-dibenzo[a,d]cycloheptene,
10,11-dihydro-5-(dimethylaminomethyl)-5H-dibenzo [a,d]cycloheptene,
5-(methylaminomethyl)-3-methylsulfonyl-5H-dibenzo [a,d]cycloheptene,
5-methylaminomethyl)-3-trifluoromethyl-5H-dibenzo [a,d]cycloheptene,
5-(methylaminomethyl)-3-methylmercapto-5H-dibenzo [a,d]cycloheptene,
5-(dimethylaminomethyl)-3-methylsulfonyl-5H-dibenzo [a,d]cycloheptene,
5-(dimethylaminomethyl)-3-trifluoromethyl-5H-dibenzo [a,d]cycloheptene,
5-(dimethylaminomethyl)-3-methylmercapto-5H-dibenzo [a,d]cycloheptene,
10,11-dihydro-5-(dimethylaminomethyl)-3-methyl-5H-dibenzo[a,d]cycloheptene,
3-chloro-10,11-dihydro-5-(dimethylaminomethyl)-5H-dibenzo[a,d]cycloheptene,
5-(dimethylaminomethyl)-3-methoxy-5H-dibenzo [a,d]cycloheptene,
1-methyl-5-(methylaminomethyl)-5H-dibenzo [a,d]cycloheptene,
2-ethyl-5-(methylaminomethyl)-5H-dibenzo [a,d]cycloheptene,
5-(methylaminomethyl)-3-tertiarybutyl-5H-dibenzo [a,d]cycloheptene,
4-methyl-5-(methylaminomethyl)-5H-dibenzo [a,d]cycloheptene,
5-(aminomethyl)-1-methyl-5H-dibenzo [a,d]cycloheptene,
5-(aminomethyl)-2-ethyl-5H-dibenzo[a,d]cycloheptene,
5-(aminomethyl)-3-tertiarybutyl-5H-dibenzo [a,d]cycloheptene,
5-(aminomethyl)-4-methyl-5H-dibenzo[a,d]cycloheptene,
5-(dimethylaminomethyl)-1-methyl-5H-dibenzo [a,d]cycloheptene,
5-(dimethylaminomethyl)-2-ethyl-5H-dibenzo [a,d]cycloheptene,
5-(dimethylaminomethyl)-3-tertiarybutyl-5H-dibenzo [a,d]cycloheptene,
5-(dimethylaminomethyl)-4-methyl-5H-dibenzo [a,d]cycloheptene,
1-chloro-10,11-dihydro-5-(methylaminomethyl)5H-dibenzo[a,d]cycloheptene,
2-chloro-10,11-dihydro-5-(methylaminomethyl)-5H-dibenzo[a,d]cycloheptene,
2-bromo-10,11-dihydro-5-(methylaminomethyl)-5H-dibenzo[a,d]cycloheptene,
4-chloro-10,11-dihydro-5-(methylaminomethyl)-5H-dibenzo[a,d]cycloheptene,
10,11-dihydro-5-(methylaminomethyl)-3-tertiarybutyl-5H-dibenzo[a,d]cycloheptene,
10,11-dihydro-2-methyl-5-(methylaminomethyl)-5H-dibenzo[a,d]cycloheptene,
10,11-dihydro-4-methyl-5-(methylaminomethyl)-5H-dibenzo[a,d]cycloheptene,
5-(aminomethyl)-1-chloro-10,11-dihydro-5H-dibenzo [a,d]cycloheptene,
5-(aminomethyl)-2-chloro-10,11-dihydro-5H-dibenzo [a,d]cycloheptene,
5-(aminomethyl)-2-bromo-10,11-dihydro-5H-dibenzo [a,d]cycloheptene,
5-(aminomethyl)-4-chloro-10,11-dihydro-5H-dibenzo [a,d]cycloheptene,
5-(aminomethyl)-3-tertiarybutyl-10,11-dihydro-5H-dibenzo[a,d]cycloheptene,
5-(aminomethyl)-2-methyl-10,11-dihydro-5H-dibenzo [a,d]cycloheptene,
5-(aminomethyl)-4-methyl-10,11-dihydro-5H-dibenzo [a,d]cycloheptene, 1-chloro-10,11-dihydro-5-(dimethylaminomethyl)-5H-dibenzo[a,d]cycloheptene, 2-chloro-10,11-dihydro-5-(dimethylaminomethyl)-5H-dibenzo[a,d]cycloheptene, 2-bromo-10,11-dihydro-5-(dimethylaminomethyl)-5H-dibenzo[a,d]cycloheptene, 4-chloro-10,11-dihydro-5-(dimethylaminomethyl)-5H-dibenzo[a,d]cycloheptene, 10,11-dihydro-5-(dimethylaminomethyl)-3-tertiarybutyl-5H-dibenzo[a,d]cycloheptene, 10,11-dihydro-5-(dimethylaminomethyl)-2-methyl-5H-dibenzo[a,d]cycloheptene, 10,11-dihydro-5-(dimethylaminomethyl)-4-methyl-5H-dibenzo[a,d]cycloheptene, 5-(aminomethyl)-10-bromo-5H-dibenzo[a,d]cycloheptene, 10-bromo-5-(N-methylaminomethyl)-5H-dibenzo[a,d]cycloheptene and 5-(methylaminomethyl-2,3,7,8-tetrahydroxy-5H-dibenzo[a,d]cycloheptene hydrochloride.

The above list of examples of compounds useful as the active component of the compositions used in the method of treatment or prevention of arrhythmia includes the class of compounds which are especially preferred for both long-term and short-term administration. This especially-preferred class of compounds are 5-(aminomethyl) - 5H - dibenzo[a,d]cycloheptene, 5 - (aminomethyl) - 10, 11 - dihydro - 5H - dibenzo[a,d]cycloheptene and the corresponding N-loweralkylaminomethyl and the N,N-diloweralkylamino derivatives, particularly 5 - (methylaminomethyl) - 5H - dibenzo[a,d]cycloheptene, 5 - (dimethylaminomethyl) - 5H - dibenzo[a,d]cycloheptene, 10,11 - dihydro - 5 - (methylaminomethyl)-5H-dibenzo[a,d]cycloheptene and 10,11-dihydro-5-(dimethylaminomethyl)-5H-dibenzo[a,d]cycloheptene.

The condition of arrhythmia is a change in the normal rhythm of the heart which is noted in the higher forms of life, particularly the larger mammals including dogs, horses, cattle and man. This disturbance in the normal rhythm of the heart of the affected animal may arise spontaneously without apparent cause or it may result from a serious heart condition. Depending on the type of arrhythmia present in the affected patient, it may vary from a momentary effect which will spontaneously be corrected, or in extremely acute cases may result in almost instantaneous death. It is therefore desirable to provide a method of treatment for acute episodes of arrhythmia in the affected patient or, alternatively, to provide a method of prophylaxis involving the administration of an agent useful in preventing arrhythmias to patients prone to such disturbances of normal heart rhythm.

One of the principal methods of treating arrhythmia using drug therapy in the past has been the administration of quinidine or procaine amide. This method suffers from toxic side effects associated with the drugs which often occur concurrently with the administration of the drug. Particularly important are gastrointestinal disturbances caused by the drugs as well as the possibility of vascular collapse. One difficulty with the administration of these prior art drugs is that the toxic side effects occur at a dosage level recommended for effective control of the arrhythmia.

It has now been found in accordance with the present invention that administration of the compounds of the present invention depicted in the above formula, results in the prevention of arrhythmia in animals under conditions which ordinarily cause the development of arrhythmia in the animal 100 percent of the time. It has further been found that administration of the compounds of the present invention will arrest an existing arrhythmia in the animal being treated and cause a resumption of normal cardiac rhythm.

Further, in accordance with the present invention, there are provided compositions containing a compound of the formula

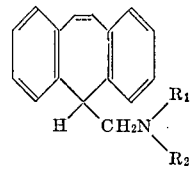

wherein $R_1$ and $R_2$ are hydrogen or loweralkyl and one or more of the hydrogens attached to the 1, 2, 3, 4, 6, 7, 8 or 9 positions is substituted by halogen (especially fluorine, chlorine or bromine), alkyl (preferably having from 1–6 carbon atoms), a perfluoroalkyl substituent having from 1–4 carbon atoms, phenyl, alkylsulfonyl (preferably having from 1–5 carbon atoms), alkylmercapto (preferably having from 1–5 carbon atoms), dialkylsulfamoyl (preferably having from 1–4 carbon atoms). The basic nucleus may contain either a single or a double bond joining the 10 and 11 carbon atoms. This is indicated in the above formula by the dotted line joining the 10 and 11 carbons. In the unsaturated series, one of the hydrogens at the 10 or 11 positions can be replaced by chlorine or bromine.

The nontoxic acid addition salts useful as components in the compositions provided by the present invention are salts formed by the reaction of an equivalent amount of the amine compound of the above formula and an acid which is pharmacologically acceptable in the intended doses. Salts of the above compound which are useful are salts of the amine with hydrochloric acid, hydrobromic acid, sulfuric acid, nitric acid, phosphoric acid, fumaric acid, acetic acid, propionic acid, lactic acid, gluconic acid, maleic acid, succinic acid, tartaric acid, and the like. Salts of these acids with the amine base are useful as the active component of the compositions in the method of this invention.

The daily doses are based on the total body weight of the test animal and vary between about 1.0 and 100.0 mg./kg. for mature animals. Thus, a unit dose based on four-times-a-day administration is between 2.5 mg. and 250 mg. for a 10 kg. dog, and a total daily dose for a 10 kg. dog would vary between about 10 mg. and 1000 mg. For larger animals up to 100 kg. and above, proportional dosages are employed, based on the weight of the animal. Suitable dosage units provided for the administration of the compositions used in the method of the invention are tablets, capsules (which may be suitably formulated for either immediate or sustained release), syrups, elixirs, parenteral solutions, and the like. These dosage forms preferably contain per unit one or more multiples of the desired dosage unit in combination with the pharmaceutically acceptable diluent or carrier required for preparing the dosage unit.

There is some variation in potency between the active compounds employed in the method of this invention and it is preferred to employ compounds which exhibit an effect in test animals at doses of from about 0.1 mg./kg. to 1,000 mg./kg. of body weight. Tests are run in experimental animals to determine the relative potency of the antiarrhythmic agent employed in the method of this invention. These tests determine the ability of the selected compound to prevent the occurrence of arrhythmia or to modify an arrhythmia already existing in the test animal.

Although the pharmaceutical compositions of our invention will ordinarily be administered within the ranges indicated, it is necessary for the skilled practitioner to determine the exact dosage based on variable encountered in treating individual subjects. These variables include the age, sex, general health, and various other factors and, in part, will all affect the determination of the exact amount of active ingredient to be administered as well as the route of administration.

The following examples are presented as an illustration of the method of this invention, as well as an illustration of the method of preparing the compositions employed in the method of the invention and the active components of such compositions. The examples also provide a method for testing the compositions useful in our method to determine the relative potency of the active ingredient of the composition of our invention.

EXAMPLE 1

Prevention or modification of ventricular arrhythmia

Beagle dogs of either sex and weighing from 6 to 10 kg. are anesthetized by the administration of vinbarbital employing a dose of 50 mg./kg. of body weight and the mean arterial pressure and the electrocardiogram (Lead II) are recorded. The animals are artificially respired and the thorax opened at the fourth or fifth interspace. The pericardium is opened and a portion of the anterior descending coronary artery just distal to the origin is freed from the surrounding tissue. Mecamylamine is administered to slow the heart rate and 10 minutes later the compound to be tested for antiarrhythmic effect is administered intravenously. Ten minutes after administration of the test compound 0.0035 ml./kg. of tetrafluorohexachlorobutane (TFHCB), a sclerosing agent which produces myocardial infarction and arrhythmia in dogs (Ascanio et al., J. Am. Physiol. 209: 1081–1088 (1965)) is injected into the coronary artery. In control animals, this dose of TFHCB produces a ventricular arrhythmia in 100% of the animals tested and death in 33% of the animals tested as a result of ventricular fibrillation.

Following injection of the sclerosing agent, an electrocardiogram is recorded at two-minute intervals for one hour and the average number of electrical (ECG) complexes per minute and the percent normal complexes calculated. The data obtained with different doses of the test compounds is plotted and the dose estimated to protect the animals is estimated graphically ($ED_{80}$ mg./kg.). This figure indicates that 80% of all the electrical (ECG) complexes are normal.

The compound 5-(N-methylaminomethyl)-5H-dibenzo-[a,d]cycloheptene is tested at doses of 0.63, 1.25, 2.5 and 5.0 mg./kg. The average percent of normal complexes calculated is 20, 47, 56 and 94, respectively. Thus, the estimated $ED_{80}$ is equal to 3.4 mg./kg. compared with guinidine sulfate which, when tested under similar condition at doses of 2.5, 5.0 and 10.0 mg./kg. gave average percent of normal values of 25, 51 and 90, respectively, giving an estimated $ED_{80}=8.8$ mg./kg.

EXAMPLE 2

Treatment of existing arrhythmia

The compounds to be tested for antiarrhythmic effect are tested in animals with an arrhythmia due to ligation of a branch of the coronary artery. The technique used to produce the arrhythmia is described by Harris (Circ. 1: 1318–1328, 1950). The test compounds are examined for their effect on total electrical rate (ECG) and ventricular ectopic rhythms.

The test animals are 6 to 10 kg. unanesthetized Beagle dogs in which the anterior descending coronary artery has been ligated one or two days prior to the test. Lead II of the ECG is recorded, the total electrical rate per minute is computed and the percent normal complexes calculated at 15-minute intervals before and after administration of the test compound. The measurements are made over a total of two hours for the 60 minutes during and the 60 minutes following administration of the test drug. To evaluate the effectiveness of the compound, data from four or more observations are averaged and plotted graphically. The area formed by the curves is measured with a planimeter. The degree of effectiveness of the test compounds is related to the size of the area under the curve.

The test compound is compared to the known antiarrhythmic agent, quinidine sulfate, in this test.

The results for a typical compound are as follows. A total of eleven observations is made in 6 dogs using 5-(N-methylaminomethyl) - 5H - dibenzo[a,d]cycloheptene administered at a dose level of 5.0 mg./kg. on the second day following ligation of the coronary artery. The average area under the curve measured was 0.85 sq. cm. The reference compound, quinidine sulfate, under similar conditions was tested at a level of 10 mg./kg. and in eight observations in four dogs, the average area under the curve was 0.51 sq. cm.

EXAMPLE 3

Active compounds in the treatment or prevention of arrhythmia in test animals

The following compounds of our invention, when tested in accordance with the procedure of Example 1, are active at doses of 2.5 mg./kg. and 5.0 mg./kg.:

10,11-dihydro-5-(methylaminomethyl)-5H-dibenzo[a,d] cycloheptene hydrochloride 10,11-dihydro-5-(dimethylaminomethyl)-5H-dibenzo [a,d]cycloheptene hydrogen maleate 5-(aminomethyl)-10,11-dihydro-3-methoxy-5H-dibenzo [a,d]cycloheptene 5-(aminomethyl)-5H-dibenzo[a,d]cycloheptene 5-(methylaminomethyl)-5H-dibenzo[a,d]cycloheptene hydrogen maleate 5-(dimethylaminomethyl)-5H-dibenzo[a,d]cycloheptene hydrogen maleate 5-(diethylaminomethyl)-5H-dibenzo[a,d]cycloheptene hydrochloride 5-(isopropylaminomethyl)-5H-dibenzo[a,d]cycloheptene hydrogen maleate 5-(dimethylaminomethyl)-5H-dibenzo[a,d]cycloheptene N-oxide hydrochloride 3-chloro-5-(methylaminomethyl)-5H-dibenzo[a,d] cycloheptene dihydrogen citrate 5-(aminomethyl)-3-methoxy-5H-dibenzo[a,d] cycloheptene 3-methoxy-5-(methylaminomethyl)-5H-dibenzo[a,d] cycloheptene hydrogen oxalate 10,11-dihydro-3-methoxy-5-(methylaminomethyl)-5H-dibenzo[a,d]cycloheptene hydrochloride 5-(aminomethyl) 10-bromo-5H-dibenzo[a,d]cycloheptene hydrogen oxalate 10-bromo-5-(methylaminomethyl)-5H-dibenzo[a,d] cycloheptene hydrogen oxalate 5-(methylaminomethyl)-2,3,7,8-tetrahydroxy-5H-dibenzo [a,d]cycloheptene hydrochloride hemihydrate

EXAMPLE 4

5-(N-methylaminomethyl)-3-methoxy-5H-dibenzo[a,d] cycloheptene

3 - (p - methoxybenzylidene)-phthalide.—Phthalic anhydride (89.61 g., 0.605 mole), p-methoxyphenylacetic acid (100.52 g., 0.605 mole) and freshly fused sodium acetate (3.0 g.) are mixed and heated at 255° C. for one hour. The water which forms is removed from the reaction mixture by distillation (9.2 ml.). The reaction mixture is cooled and the resulting crystalline residue is dissolved in four liters of boiling absolute ethanol and crystallized overnight at room temperature. The product is collected and dried. M.P. 147.5–149° C. An analytical sample from another experiment melts at 147.5–148° C.

*Analysis.*—Calcd. for $C_{16}H_{12}O_3$ (percent): C, 76.18; H, 4.80. Found (percent): C, 75.78; H, 5.00.

2 - (p - methoxyphenethyl)-benzoic acid.—3-(p-methoxybenzylidene)-phthalide (52.5 g., 0.21 mole) is dissolved in 1500 ml. of ethanol, six tablespoonsful of Raney nickel catalyst are added, and the mixture is hydrogenated at 25° C. and 40 p.s.i. After separating the catalyst, the filtrate is evaporated to dryness under reduced pressure on the steam-bath. The residue is heated on steam-bath for one hour with 400 ml. of saturated sodium bicarbonate solution, then diluted with 100 ml. of water and extracted with three 200 ml. portions of methylene chloride. The aqueous solution is heated on a steam-bath for forty-five minutes to completely remove methylene chloride, and the turbid solution is filtered through a mat of diatomaceous earth. The clear filtrate is acidified with 3 N hydrochloric acid and the precipitated white solid collected and washed with water. After drying, the product melts at 116.5–118.5° C. Recrystallization from 100 ml. benzene—25 ml. hexane yields product melting at 118–119.5° C. An analytical sample from another experiment melts at 119–120.5° C.

*Analysis.*—Calcd. for $C_{16}H_{16}O_3$ (percent): C, 74.98; H, 6.29. Found (percent): C, 74.63; H, 6.03.

3-methoxy - 10,11 - dihydro-5H - dibenzo[a,d]cyclohepten-5-one.—A solution of dry ether, 48 ml., containing four drops of dry pyridine is cooled in an ice-bath while thionyl chloride, 16 ml., and then 2-(p-methoxyphenethyl)-benzoic acid (28.9 g., 0.113 mole) are added. The mixture is stirred at room temperature for thirty minutes, and then refluxed on a steam-bath for an additional fifteen minutes. The clear yellow solution is evaporated in a water-bath below 40° C. under reduced pressure and the oily residue is dissolved in 116 ml. of dry benzene. The solution is cooled in an ice-bath and stirred while a solution of stannic chloride (30 ml., 0.26 mole) in 30 ml. of dry benzene is added over fifteen minutes. The brown reaction mixture is stirred in an ice-bath for three hours, and then hydrolyzed with 96 ml. of concentrated hydrochloric acid. Two additional identical runs are made. The supernatant solutions from the three runs are decanted and combined. The black oily residues are mixed with methylene chloride (600 ml.) and water (225 ml.) and refluxed on a steam-bath with stirring for approximately forty-five minutes. The methylene chloride layer is separated and the extraction is repeated with two additional 600 ml. portions of methylene chloride. The combined methylene chloride solutions then are used to extract the aqueous solutions which originally were decanted from the black oily residues. The organic extracts then are washed three times each with 3 N hydrochloric acid, water, saturated sodium bicarbonate solution and water. After drying over anhydrous magnesium sulfate, the solvent is removed under reduced pressure on a steam-bath. The brown oily residue is distilled and the product distills as a yellow oil at 150–155° C./0.08–0.1 mm.

3 - methoxy - 5H - dibenzo[a,d]cyclohepten - 5 - one.—3-methoxy - 10,11 - dihydro-5H-dibenzo[a,d]cyclohepten-5-one (19.43 g., 0.0815 mole) is dissolved in 167 ml. of carbon tetrachloride, N-bromosuccinimide (72.98 g., 0.41 mole) and then benzoyl peroxide, 295 mg., are added and the mixture is stirred and heated to refluxing cautiously. The mixture is stirred at reflux for two hours, then cooled to room temperature and the succinimide separated by filtration. The combined filtrate and washings containing the brominated intermediate are extracted three times with 5% sodium hydroxide, washed with water and dried over magnesium sulfate. The solvent is distilled on the steam-bath under reduced pressure, and triethylamine, 148 ml., is added to the yellow solid residue. The mixture is heated to refluxing with stirring for sixteen hours. After cooling, the mixture is diluted with 200 ml. of benzene and washed three times with water. After filtering to remove some amorphous material, the benzene and triethylamine are removed by evaporation under reduced pressure. The residue is dissolved in 175 ml. of benzene and the solution is extracted with 3 N hydrochloric acid, washed with water and the solvent is evaporated under reduced pressure on the steam-bath. The residue is sublimed at 135° C./0.07 mm. The sublimate is crystallized from 35 ml. of cyclohexane, yielding product melting at 62–65° C. An analytical sample from another experiment melts at 68.2–69.6° C.

*Analysis.*—Calcd. for $C_{16}H_{12}O_2$ (percent): C, 81.33; H, 5.12. Found (percent): C, 81.68; H, 5.26.

3 - methoxy - 5H - dibenzo[a,d]cyclohepten-5 - ol.—3-methoxy - 5H - dibenzo[a,d]cyclohepten - 5 - one (3.08 g., 0.013 mole) is dissolved in 39 ml. of refluxing absolute ethanol. A solution of potassium borohydride (1.35 g., 0.025 mole) in 7.8 ml. of water, to which 0.1 ml. of 10 N sodium hydroxide solution is added, is added dropwise over ten minutes with heating and stirring. The solution is refluxed for two hours and then filtered. The filtrate is concentrated to a volume of approximately 25 ml., diluted to incipient cloudiness with 11 ml. of water and the product crystallizes as a pale pink solid melting at 122–123° C.

5-chloro-3-methoxy - 5H - dibenzo[a,d]cycloheptene.—Anhydrous ether, 20 ml., is cooled in an ice-bath and saturated with anhydrous hydrogen chloride for thirty minutes. A solution of 3-methoxy-5H-dibenzo[a,d]cyclohepten-5-ol (2.73 g., 0.0115 mole) dissolved in 75 ml. of ether then is added and the mixture is stirred while bubbling hydrogen chloride into the mixture for an additional forty-five minutes. After stirring in the ice-bath for two hours, the solid is collected and dried. M.P. 154–155° C.

5-cyano-3-methoxy - 5H - dibenzo[a,d]cycloheptene.—A warm solution of 5-chloro-3-methoxy-5H-dibenzo[a,d]cycloheptene (2.18 g., 0.0085 mole) dissolved in 40 ml. of benzene is added rapidly to a stirred suspension of silver cyanide (1.26 g., 0.0094 mole) in 20 ml. of benzene. The mixture is stirred and heated to refluxing for fifteen hours. While hot, the reaction mixture is filtered and the filtrate is evaporated to dryness on the steam-bath under reduced pressure. The solid residue is crystallized from a mixture of 18 ml. of 95% ethanol-3 ml. of water. The product is a white solid melting at 148.5–149.5° C. An analytical sample melts at 149.5–150° C. after sublimation at 110° C./0.1 mm.

*Analysis.*—Calcd. for $C_{17}H_{13}NO$ (percent): C, 82.57; H, 5.30. Found (percent): C, 82.55; H, 5.31.

5-aminomethyl-3-methoxy - 5H - dibenzo[a,d]cycloheptene.—Lithium aluminum hydride (0.40 g., 0.0106 mole) is added to 10 ml. of anhydrous ether and the mixture is stirred while a solution of aluminum chloride (1.41 g., 0.0106 mole) in 10 ml. of anhydrous ether is added rapidly. The mixture is stirred for five minutes and then a solution of 5-cyano-3-methoxy-5H-dibenzo[a,d]cycloheptene (1.75 g., 0.00708 mole) in a mixture of 50 ml. of tetrahydrofuran and 50 ml. of ether is added dropwise over thirty minutes. The mixture is stirred at room temperature for 19½ hours, and then excess hydride is decomposed with 8 ml. of water. The mixture is treated with 16 ml. of 6 N sulfuric acid and diluted with 500 ml. of water and 350 ml. of ether. The mixture is rendered alkaline with 20% sodium hydroxide solution, the ether layer is separated and the aqueous phase is extracted with two additional 350 ml. portions of ether. The combined ether extracts are washed once with water and then concentrated under reduced pressure to a volume of approximately 150 ml. The ethereal solution then is extracted with three 25 ml. portions of 0.5 M citric acid solution and washed three times with water. The combined acidic extracts and water washes are rendered alkaline with 13 ml. of 40% sodium hydroxide solution and extracted with three 100 ml. portions of ether. After washing with water and drying, the ether is evaporated on a steam-bath under reduced pressure, leaving a white solid residue weighing 1.60 g. Crystallization of the residue from 13 ml. of hexane yields product melting at 95–96° C. An analytical sample melts at 96–97° C.

*Analysis.*—Calcd. for $C_{17}H_{17}NO$ (percent): C, 81.24; H, 6.82; N, 5.57. Found (percent): C, 81.05; H, 6.72; N, 5.65.

5 - formamidomethyl-3-methoxy-5H-dibenzo[a,d]cycloheptene.—A solution of 3-methoxy-5H-dibenzo[a,d]cyclohepten-5-methylamine (0.96 g., 0.0038 mole) dissolved in 50 ml. of methyl formate is heated in an autoclave at 110° C. for sixteen hours. The yellow solution then is evaporated on a steam-bath under reduced pressure. The residue is dissolved in 30 ml. of benzene, washed three times each with 3 N hydrochloric acid and water, dried and the solvent is evaporated under reduced pressure on the steam-bath. The product is a viscous, yellow oil. It is used in the subsequent reaction without further purification.

3-methoxy-5-(methylaminomethyl) - 5H - dibenzo[a,d] cycloheptene.—Anhydrous ether, 11 ml., is added to lithium aluminum hydride (220 mg., 0.0058 mole) and the mixture is stirred while a solution of 5-formamidomethyl-3-methoxy-5H-dibenzo[a,d]cycloheptene (1.06 g., 0.0038 mole) dissolved in 70 ml. of anhydrous ether is added dropwise at such a rate that gentle refluxing is maintained. The addition requires approximately forty minutes. The mixture then is heated to refluxing for twenty-six hours with stirring. Ethyl acetate, 10 ml., is added dropwise to decompose the excess hydride and the mixture is treated with 20% sodium hydroxide solution, 4 ml., and water, 10 ml., and stirred vigorously for fifteen minutes. The ether layer is separated and washed once with water. The ethereal solution then is extracted with three 25 ml. portions of 0.5 M citric acid solution and washed twice with water. The combined acidic extracts and water washes are rendered alkaline with 40% sodium hydroxide solution and extracted three times with 100 ml. portions of ether. The combined extracts are washed three times with water, dried and the solvent is evaporated under reduced pressure on a steam-bath. The residue is a pale yellow oil. The oil is dissolved in 10 ml. of absolute ethanol; a solution of oxalic acid (243 mg., 0.0027 mole) in 10 ml. of absoulte ethanol is added and the hydrogen oxalate salt precipitates immediately as a white solid melting at 210–211° C. with decomposition. Recrystallization from absolute ethanol yields an analytical sample melting at 212–212.5° C.

*Analysis.*—Calcd. for $C_{18}H_{19}NO \cdot C_2H_2O_4$ (percent): C, 67.59; H, 5.96; N, 3.94. Found (percent): C, 67.74; H, 5.68; N, 4.03.

EXAMPLE 5

10-bromo-5-(methylaminomethyl)-5H-dibenzo[a,d] cycloheptene 10-bromo-5H-dibenzo[a,d]cyclohepten-5-ol.—10 - bromo-5H-dibenzo[a,d]cyclohepten-5-one (10.00 g., 0.035 mole) is dissolved in 105 ml. of refluxing absolute ethanol. A solution of potassium borohydride (3.67 g., 0.068 mole) in 21 ml. of water, to which 0.2 ml. of 10 N sodium hydroxide solution is added, is added dropwise over ten minutes with heating and stirring. The solution is refluxed for two hours and then evaporated to dryness on the steam-bath under reduced pressure. The residue is distributed between 250 ml. of methylene chloride and 100 ml. of water, the methylene chloride layer is separated, washed twice with water and evaporated to dryness on the steam-bath under reduced pressure. The oily residue is dissolved in 700 ml. of boiling hexane, filtered, and the filtrate is concentrated to approximately 115 ml. The product crystallizes as a yellow solid melting at 123.8–124.3° C. An analytical sample from another experiment melts at 122.8–123.3° C.

*Analysis.*—Calcd. for $C_{15}H_{11}BrO$ (percent): C, 62.74; H, 3.86; Br, 27.83. Found (percent): C, 62.11; H, 3.83; Br, 28.56.

10 - bromo-5-chloro-5H-dibenzo[a,d]cycloheptene.— 10-bromo-5H-dibenzo[a,d]cyclohepten-5-ol (9.21 g., 0.032 mole) is dissolved in 180 ml. of benzene and the solution is cooled in an ice-bath while saturating with hydrogen chloride for 2½ hours. After standing overnight at room temperature, the solution is washed with four 100 ml. portions of water and evaporated to dryness on the steam-bath under reduced pressure to yield the product as a yellow oily residue.

10-bromo - 5 - cyano-5H-dibenzo[a,d]cycloheptene.—A solution of 10 - bromo - 5 - chloro-5H-dibenzo[a,d]cycloheptene (8.10 g., 0.0265 mole) dissolved in 125 ml. of benzene is added rapidly to a stirred suspension of silver cyanide (3.89 g., 0.029 mole) in 63 ml. of benzene. The mixture is stirred and heated to refluxing for seventeen hours. The hot reaction mixture is filtered. The solid on the filter is extracted with 500 ml. of boiling benzene for thirty minutes and then filtered. The combined filtrates containing the product are evaporated to dryness on the steam-bath under reduced pressure. The resulting tan solid product is used in the subsequent reaction without further purification.

5-(aminomethyl) - 10 - bromo-5H-dibenzo[a,d]cycloheptene.—Anhydrous ether, 10.5 ml., is added to lithium aluminum hydride (383 mg., 0.0101 mole) and the mixture is stirred while a solution of aluminum chloride (1.35 g., 0.0101 mole) in 10.5 ml. of anhydrous ether is added rapidly. The mixture is stirred for five minutes and then a solution of 10 - bromo - 5 - cyano-5H-dibenzo[a,d] cycloheptene (2.00 g., 0.00675 mole) in a mixture of 75 ml. of ether and 25 ml. of tetrahydrofuran is added dropwise, over thirty minutes. The mixture is stirred at room temperature for seventeen hours and then excess hydride is decomposed with 10 ml. of water. The mixture is treated with 20 ml. of 6 N sulfuric acid and diluted with 15 ml. of water. The ether layer is separated and extracted with two 25 ml. portions of 0.5 M citric acid solution. After washing the ether layer three times with 50 ml. of water, the combined washings and acid extracts are rendered alkaline with 40% sodium hydroxide solution, extracted three times with ether, and the ether is evaporated to dryness on a steam-bath under reduced pressure leaving the product as a yellow oily residue of the free base. In another experiment, the free base melts at 81.5–82.5° C. after crystallization from hexane.

*Analysis.*—Calcd. for $C_{16}H_{14}BrN$ (percent): C, 64.01; H, 4.70; Br, 26.62. Found (percent): C, 64.04; H, 4.51; Br, 26.49.

The free base (1.56 g., 0.0052 mole) is dissolved in 15 ml. of absolute ethanol, a solution of oxalic acid (522 mg., 0.0058 mole) in 5 ml. of absolute ethanol is added and the hydrogen oxalate salt precipitates immediately as a white solid. Recrystallization from a mixture of absolute ethanol and absolute methanol yields an analytical sample melting at 222° C. with decomposition.

*Analysis.*—Calcd. for $C_{16}H_{14}BrN \cdot C_2H_2O_4$ (percent): C, 55.40; H, 4.13; Br, 20.48. Found (percent): C, 55.55; H, 4.17; Br, 20.33.

10 - bromo - 5 - formamidomethyl - 5H - dibenzo[a,d] cycloheptene.—A solution of 5-(aminomethyl)-10-bromo-5H-dibenzo[a,d]cycloheptene (1.35 g., 0.0045 mole) dissolved in 60 ml. of methyl formate is heated in an autoclave at 110° C. for sixteen hours. The yellow solution is evaporated on a steam-bath under reduced pressure. The oily residue is dissolved in 70 ml. of benzene, washed three times each with 0.5 M citric acid solution and water, dried and the solvent is evaporated under reduced pressure on the steam-bath, leaving the product as an oily residue. It is used in the subsequent reaction without further purification.

10-bromo - 5 - (methylaminomethyl)-5H-dibenzo[a,d] cycloheptene.—Anhydrous ether, 9 ml., is added to lithium aluminum hydride (83 mg., 0.00218 mole) and the mixture is stirred while a solution of 10-bromo-5-formamidomethyl-5H-dibenzo[a,d]cycloheptene (0.96 g., 0.0029 mole) dissolved in 56 ml. of anhydrous ether is added dropwise at such a rate that gentle refluxing is maintained. The addition requires thirty minutes. The mixture is stirred at room temperature for twenty hours, and then excess hydride is decomposed by the dropwise addition of 4 ml. of water. The mixture is treated with 20% sodium hydroxide solution, 3 ml., and diluted with 50 ml. of water and 50 ml. of ether. The aqueous layer is separated and extracted with 50 ml. of ether. The combined ether extracts are extracted with three 25 ml. portions of 0.5 M citric acid solution and washed three times with water. The combined acidic extracts and water washes are rendered alakline with 40% sodium hydroxide solution and extracted three times with 75 ml. portions of ether. After washing with water, the combined ether extracts are evaporated to dryness on the steam-bath under reduced pressure. The yellow oily residue of the free base weighs 0.74 g. (81%). The base (0.74 g., 0.00236 mole) is dissolved in 20 ml. of isopropyl alcohol, a solution of oxalic acid (234 mg., 0.0026 mole) in 10 ml. of isopropyl alcohol is added and the solution is concentrated to approximately 25 ml. The hydrogen oxalate salt crystallizes as a white solid melting at 161.7–162.7° C. with decomposition. An analytical sample from another experiment melts at 164.5–165.2° C. with decomposition after recrystallization from isopropyl alcohol.

Analysis.—Calcd. for $C_{17}H_{16}BrN \cdot C_2H_2O_4$ (percent): C, 56.45; H, 4.49; Br, 19.77. Found (percent): C, 56.21; H, 4.35; Br, 19.98.

EXAMPLE 6

5-(aminomethyl)-5H-dibenzo[a,d]cycloheptene

A solution of anhydrous aluminum chloride (6.21 g., 0.0466 mole) in 75 ml. of anhydrous ether is added dropwise to a solution of lithium aluminum hydride (1.77 g., 0.0466 mole) in 50 ml. of absolute ether while stirring. An atmosphere of nitrogen is maintained in the apparatus and all vents are protected with drying tubes during the reaction. A solution of 5-cyano-5H-dibenzo[a,d]cycloheptene (10.13 g., 0.0466 mole) in 250 ml. of absolute ether is added dropwise with stirring (occasional warming of this solution may be necessary to prevent precipitation of the nitrile). The reaction mixture is stirred at 23–26° C. for 1 hour after the addition is complete. Water, 35 ml., then is added dropwise. Dilute sulfuric acid is added, causing precipitation of a white solid. The solid is collected, suspended in water, and the mixture rendered strongly alkaline with sodium hydroxide solution. The filtrate also is rendered strongly alkaline and both mixtures, containing suspended solids, are extracted separately with ether. Distillation of the ether from the combined extracts leaves a white solid residue, M.P. 95–96.5° C., weighing 10.04 g. Recrystallization from hexane gives 8.71 g. of product, M.P. 97.5–98.3° C. (sinters 97° C.). An analytical sample melts at 98–98.8° C. (sinters 97° C.).

Analysis.—Calcd. for $C_{16}H_{15}N$ (percent): C, 86.84; H, 6.83; N, 6.33. Found (percent): C, 87.13; H, 6.87; N, 6.23.

The procedure is repeated, starting with 10,11-dihydro-5-cyano-5H-dibenzo[a,d]cycloheptene, instead of 5-cyano-5H-dibenzo[a,d]cycloheptene, with resultant production of 5-(aminomethyl)-10,11-dihydro-5H-dibenzo[a,d]cycloheptene as an oil.

Hydrogen maleate salt, M.P. 165–166° C. (from ethanol-ether).

Analysis.—Calcd. for $C_{16}H_{17}N \cdot C_4H_4O_4$ (percent): C, 70.78; H, 6.24; N, 4.13. Found (percent): C, 71.03; H, 6.06; N, 4.10.

EXAMPLE 7

Following substantially the same procedure as Example 6, and replacing the 5-cyano-5H-dibenzo[a,d]cycloheptene of Example 6 with 5-cyanodibenzocycloheptenes listed below, there are obtained the products enumerated below.

| Starting Materials | Products |
|---|---|
| 5-cyano-3-methylsulfonyl-5H-dibenzo[a,d]cycloheptene. | 5-(aminomethyl)-3-methylsulfonyl-5H-dibenzo[a,d]cycloheptene. |
| 5-cyano-3-dimethylsulfamoyl-5H-dibenzo[a,d]cycloheptene. | 5-(aminomethyl)-3-dimethylsulfamoyl-5H-dibenzo[a,d]cycloheptene. |
| 3-chloro-5-cyano-10,11-dihydro-5H-dibenzo[a,d]cycloheptene. | 5-(aminomethyl)-3-chloro-10,11-dihydro-5H-dibenzo[a,d]cycloheptene. |
| 5-cyano-3-methyl-5H-dibenzo[a,d]cycloheptene. | 5-(aminomethyl)-3-methyl-5H-dibenzo[a,d]cycloheptene. |
| 3-chloro-5-cyano-5H-dibenzo[a,d]cycloheptene. | 5-(aminomethyl)-3-chloro-5H-dibenzo[a,d]cycloheptene. |
| 5-cyano-3-trifluoromethyl-5H-dibenzo[a,d]cycloheptene. | 5-(aminomethyl)-3-trifluoromethyl-5H-dibenzo[a,d]cycloheptene. |
| 5-cyano-3-methoxy-5H-dibenzo[a,d]cycloheptene. | 5-(aminomethyl)-3-methoxy-5H-dibenzo[a,d]cycloheptene. |
| 5-cyano-3-methylmercapto-5H-dibenzo[a,d]cycloheptene. | 5-(aminomethyl)-3-methylmercapto-5H-dibenzo[a,d]cycloheptene. |
| 5-cyano-1-methyl-5H-dibenzo[a,d]cycloheptene. | 5-(aminomethyl)-1-methyl-5H-dibenzo[a,d]cycloheptene. |
| 5-cyano-2-ethyl-5H-dibenzo[a,d]cycloheptene. | 5-(aminomethyl)-2-ethyl-5H-dibenzo[a,d]cycloheptene. |
| 5-cyano-3-tertiarybutyl-5H-dibenzo[a,d]cycloheptene. | 5-(aminomethyl)-3-tertiarybutyl-5H-dibenzo[a,d]cycloheptene. |
| 5-cyano-4-methyl-5H-dibenzo[a,d]cycloheptene. | 5-(aminomethyl)-4-methyl-5H-dibenzo[a,d]cycloheptene. |
| 5-cyano-1-chloro-10,11-dihydro-5H-dibenzo[a,d]cycloheptene. | 5-(aminomethyl)-1-chloro-10,11-dihydro-5H-dibenzo[a,d]cycloheptene. |
| 2-chloro-5-cyano-10,11-dihydro-5H-dibenzo[a,d]cycloheptene. | 5-(aminomethyl)-2-chloro-10,11-dihydro-5H-dibenzo[a,d]cycloheptene. |
| 2-bromo-5-cyano-10,11-dihydro-5H-dibenzo[a,d]cycloheptene. | 5-(aminomethyl)-2-bromo-10,11-dihydro-5H-dibenzo[a,d]cycloheptene. |
| 4-chloro-5-cyano-10,11-dihydro-5H-dibenzo[a,d]cycloheptene. | 5-(aminomethyl)-4-chloro-10,11-dihydro-5H-dibenzo[a,d]cycloheptene. |
| 5-cyano-10,11-dihydro-3-tertiarybutyl-5H-dibenzo[a,d]cycloheptene. | 5-(aminomethyl)-10,11-dihydro-3-tertiarybutyl-5H-dibenzo[a,d]cycloheptene. |
| 5-cyano-10,11-dihydro-2-methyl-5H-dibenzo[a,d]cycloheptene. | 5-(aminomethyl)-10,11-dihydro-2-methyl-5H-dibenzo[a,d]cycloheptene. |
| 5-cyano-10,11-dihydro-4-methyl-5H-dibenzo[a,d]cycloheptene. | 5-(aminomethyl)-10,11-dihydro-4-methyl-5H-dibenzo[a,d]cycloheptene. |

EXAMPLE 8

5-formamidomethyl-5H-dibenzo[a,d]cycloheptene 5-(aminomethyl)-5H - dibenzo[a,d]cycloheptene (4.82 g., 0.0218 mole) and methyl formate, 200 ml., are heated to 110° C. for 16½ hours in an autoclave. The yellow solution is evaporated to dryness on a film evaporator under reduced pressure. The residue is dissolved in benzene, the solution extracted with dilute hydrochloric acid, then with water, and dried over anhydrous sodium sulfate. The benzene is evaporated and the residue dried to constant weight in a film evaporator under reduced pressure. The yellow solid residue weighs 5.49 g., and melts at 115–117.5° C. to a cloudy melt, clearing at 119° C. Recrystallization from mixtures of benzene and hexane, followed by recrystallization from mixtures of ethanol and water, gives a product melting at 120.3–121° C. (clears 121.8° C.).

Analysis.—Calcd. for $C_{17}H_{15}NO$ (percent): C, 81.90; H, 6.06; N, 5.62. Found (percent): C, 82.25; H, 5.85; N, 5.58.

The procedure is repeated, using 5-(aminomethyl)-10,11-dihydro-5H-dibenzo[a,d]cycloheptene, instead of 5-(aminomethyl - 5H - dibenzo[a,d]cycloheptene, with resultant product of 10,11-dihydro-5-formamidomethyl-5H-dibenzo[a,d]cycloheptene.

White needles, M.P. 108–110° C. (from ether-petroleum ether, and sublimation at 100° C./0.05 mm.).

Analysis.—Calcd. for $C_{17}H_{17}NO$ (percent): C, 81.24; H, 6.82; N, 5.57. Found (percent): C, 81.00; H, 6.46; N, 5.95.

EXAMPLE 9

Following substantially the same procedure of Example 8, and replacing the 5 - (aminomethyl) - 5H - dibenzo[a,d]cycloheptene of Example 8 with the 5 - aminomethyldibenzocycloheptenes enumerated in Example 7, the following products are obtained:

5-formamidomethyl-3-methylsulfonyl-5H-dibenzo[a,d]cycloheptene 3-dimethylsulfamoyl-5-formamidomethyl-5H-dibenzo[a,d]cycloheptene 3-chloro-10,11-dihydro-5-formamidomethyl-5H-dibenzo[a,d]cycloheptene 5-formamidomethyl-3-methyl-5H-dibenzo
[a,d]cycloheptene
3-chloro-5-formamidomethyl-5H-dibenzo
[a,d]cycloheptene
5-formamidomethyl-3-trifluoromethyl-5H-dibenzo
[a,d]cycloheptene
5-formamidomethyl-3-methoxy-5H-dibenzo
[a,d]cycloheptene
5-formamidomethyl-3-methylmercapto-5H-dibenzo
[a,d]cycloheptene
2-ethyl-5-formamidomethyl-5H-dibenzo
[a,d]cycloheptene
5-formamidomethyl-1-methyl-5H-dibenzo
[a,d]cycloheptene
5-formamidomethyl-3-tertiarybutyl-5H-dibenzo
[a,d]cycloheptene
5-formamidomethyl-4-methyl-5H-dibenzo
[a,d]cycloheptene
1-chloro-10,11-dihydro-5-formamidomethyl-5H-dibenzo
[a,d]cycloheptene
2-chloro-10,11-dihydro-5-formamidomethyl-5H-dibenzo
[a,d]cycloheptene
2-bromo-10,11-dihydro-5-formamidomethyl-5H-dibenzo
[a,d]cycloheptene
4-chloro-10,11-dihydro-5-formamidomethyl-5H-dibenzo
[a,d]cycloheptene
10,11-dihydro-5-formamidomethyl-3-tertiarybutyl-5H-dibenzo[a,d]cycloheptene
10,11-dihydro-5-formamidomethyl-2-methyl-5H-dibenzo
[a,d]cycloheptene
10,11-dihydro-5-formamidomethyl-4-methyl-5H-dibenzo
[a,d]cycloheptene.

EXAMPLE 10

5-(methylaminomethyl)-5H-dibenzo[a,d]cycloheptene
hydrogen maleate

5 - formamidomethyl - 5H - dibenzo[a,d]cycloheptene (3.80 g., 0.015 mole), dissolved in 400 ml. of absolute ether is added gradually to a solution of lithium aluminum hydride (0.87 g., 0.023 mole) in 45 ml. of absolute ether at a rate such that gentle refluxing is maintained. The reaction mixture, containing a precipitate, is heated to refluxing with stirring for 26 hours. After cooling to room temperature, 10 ml. of ethyl acetate is added to decompose the excess hydride. Water, 1 ml., 15% sodium hydroxide, 1 ml., and water, 3 ml., then are added to the vigorously stirred reaction mixture. After standing for several days, the reaction mixture is filtered and the solid washed several times by suspension in ether. The combined filtrates and ether washings are evaporated on a film evaporator under reduced pressure, the pale yellow oily residue is dissolved in dilute hydrochloric acid, the solution extracted with ether to remove nonbasic material, then rendered alkaline and the product extracted with ether. After washing with water and drying over anhydrous sodium sulfate, the ether is evaporated on a film evaporator under reduced pressure. The yellow oily residue weighs 3.05 g. A 2.95 g. portion is dissolved in isopropyl alcohol and a solution of 1.60 g. (0.0138 mole) of maleic acid in 5 ml. of isopropyl alcohol is added. The hydrogen maleate salt of the product separates out in white crystals. It melts at 163–164° C. (clears, 165° C.) after further recrystallization from isopropyl alcohol and drying in vacuo over phosphorus pentoxide.

*Analysis.*—Calcd. for $C_{17}H_{17}N \cdot C_4H_4O_4$ (percent): C, 71.78; H, 6.02; N, 3.99. Found (percent): C, 71.57; H, 6.02; N, 3.91.

The procedure is repeated, using 10,11 - dihydro - 5-formamidomethyl - 5H - dibenzo[a,d]cycloheptene as the starting material, instead of 5 - formamidomethyl-5H-dibenzo[a,d]cycloheptene, with the resultant production of 10,11 - dihydro - 5 - (methylaminomethyl)-5H-dibenzo[a,d]cycloheptene as an oil.

Hydrochloride salt, M.P. 249–251° C. (from ethanol).

*Analysis.*—Calcd. for $C_{17}H_{19}N \cdot HCl$ (percent): C, 74.67; H, 7.37; N, 5.12. Found (percent): C, 74.49; H, 7.30; N, 5.09.

EXAMPLE 11

Following substantially the same procedure of Example 10, and replacing the 5 - formamidomethyl-5H-dibenzo[a,d]cycloheptene of Example 10 with the 5-formamidomethyldibenzocycloheptenes enumerated in Example 9, the following products are obtained:

5-(methylaminomethyl)-3-methylsulfonyl-5H-dibenzo-
[a,d]cycloheptene
3-dimethylsulfamoyl-5-(methylaminomethyl)-5H-dibenzo-
[a,d]cycloheptene
3-chloro-10,11-dihydro-5-(methylaminomethyl)-5H-
dibenzo[a,d]cycloheptene
3-methyl-5-(methylaminomethyl)-5H-dibenzo
[a,d]cycloheptene
3-chloro-5-(methylaminomethyl)-5H-dibenzo
[a,d]cycloheptene
5-(methylaminomethyl)-3-trifluoromethyl-5H-dibenzo
[a,d]cycloheptene
5-(methylaminomethyl)-3-methoxy-5H-dibenzo
[a,d]cycloheptene
5-(methylaminomethyl)-3-methylmercapto-5H-dibenzo
[a,d]cycloheptene
2-ethyl-5-(methylaminomethyl)-5H-dibenzo
[a,d]cycloheptene
1-methyl-5-(methylaminomethyl)-5H-dibenzo
[a,d]cycloheptene
5-(methylaminomethyl)-3-tertiarybutyl-5H-dibenzo
[a,d]cycloheptene
4-methyl-5-(methylaminomethyl)-5H-dibenzo
[a,d]cycloheptene
1-chloro-10,11-dihydro-5-(methylaminomethyl)-5H-
dibenzo[a,d]cycloheptene
2-chloro-10,11-dihydro-5-(methylaminomethyl)-5H-
dibenzo[a,d]cycloheptene
2-bromo-10,11-dihydro-5-(methylaminomethyl)-5H-
dibenzo[a,d]cycloheptene
4-chloro-10,11-dihydro-5-(methylaminomethyl)-5H-
dibenzo[a,d]cycloheptene
10,11-dihydro-5-(methylaminomethyl)-3-tertiarybutyl-
5H-dibenzo[a,d]cycloheptene
10,11-dihydro-2-methyl-5-(methylaminomethyl)-5H-
dibenzo[a,d]cycloheptene
10,11-dihydro-4-methyl-5-(methylaminomethyl)-5H-
dibenzo[a,d]cycloheptene.

EXAMPLE 12

5-(dimethylaminomethyl)-5H-dibenzo[a,d]
cycloheptene hydrogen maleate 5-(aminomethyl-5H-dibenzo[a,d]cycloheptene (1.20 g., 0.0054 mole) is dissolved in 4.4 g. of 88% formic acid while cooling. Formaldehyde (1.5 ml. of a 37% solution) is added and the mixture heated in an oil bath at 95° C. Heating is interrupted when gas evolution becomes vigorous and resumed when it subsides. Heating is continued for 8 hours. After cooling to room temperature, 3 ml. of 4 N hydrochloric acid is added and the mixture is evaporated to dryness on a film evaporator under reduced pressure. The residue is dissolved in water and the soluiton is rendered alkaline with sodium hydroxide solution. The product is extracted into benzene, the extract is washed with water and dried over anhydrous sodium sulfate. Evaporation of the benzene and drying the residue on a film evaporator under reduced pressure gives 1.34 g. of the yellow oily base. The base, 1.31 g., is dissolved in 10 ml. of isopropyl alcohol and a solution of 0.67 g. of maleic acid in 3 ml. of isopropyl alcohol is added. The hydrogen maleate separates and after the addition of ether, it is collected and recrystallized from isopropyl alcohol. The product melts at 169.8–170.8° C. (clears 171.3° C.).

*Analysis.*—Calcd. for $C_{18}H_{19}N \cdot C_4H_4O_4$ (percent): C, 72.31; H, 6.34; N, 3.83. Found (percent): C, 72.20; H, 6.42; N, 3.72.

The procedure is repeated, using 5-(aminomethyl)-10,11-dihydro-5H-dibenzo[a,d]cycloheptene as the starting material instead of 5-(aminomethyl) - 5H - dibenzo[a,d]cycloheptene, with resultant production of 10,11-dihydro-5-(dimethylaminomethyl)-5H - dibenzo[a,d]cycloheptene as oil.

Hydrogen maleate salt, M.P. 133.5–134.5° C. (from isopropyl alcohol).

*Analysis.*—Calcd. for $C_{18}H_{21}N \cdot C_4H_4O_4$ (percent): C, 71.91; H, 6.86; N, 3.81. Found (percent): C, 71.98; H, 6.68; N, 4.07.

EXAMPLE 13

Following substantially the same procedure of Example 12, and replacing the 5-(aminomethyl)-5H-dibenzo[a,d]cycloheptene of Example 12 with the 5-aminomethyldibenzocycloheptenes of Example 7, the following products are obtained:

5-(dimethylaminomethyl)-3-methylsulfonyl-5H-dibenzo[a,d]cycloheptene
5-(dimethylaminomethyl)-3-dimethylsulfamoyl-5H-dibenzo[a,d]cycloheptene
3-chloro-10,11-dihydro-5-(dimethylaminomethyl)-5H-dibenzo[a,d]cycloheptene
5-(dimethylaminomethyl)-3-methyl-5H-dibenzo[a,d]cycloheptene
3-chloro-5-(dimethylaminomethyl)-5H-dibenzo[a,d]cycloheptene
5-(dimethylaminomethyl)-3-trifluoromethyl-5H-dibenzo[a,d]cycloheptene
5-(dimethylaminomethyl)-3-methoxy-5H-dibenzo[a,d]cycloheptene
5-(dimethylaminomethyl)-3-methylmercapto-5H-dibenzo[a,d]cycloheptene
5-(dimethylaminomethyl)-1-methyl-5H-dibenzo[a,d]cycloheptene
5-(dimethylaminomethyl)-2-ethyl-5H-dibenzo[a,d]cycloheptene
5-(dimethylaminomethyl)-3-tertiarybutyl-5H-dibenzo[a,d]cycloheptene
5-(dimethylaminomethyl)-4-methyl-5H-dibenzo[a,d]cycloheptene
1-chloro-10,11-dihydro-5-(dimethylaminomethyl)-5H-dibenzo[a,d]cycloheptene
2-chloro-10,11-dihydro-5-(dimethylaminomethyl)-5H-dibenzo[a,d]cycloheptene
2-bromo-10,11-dihydro-5-(dimethylaminomethyl)-5H-dibenzo[a,d]cycloheptene
4-chloro-10,11-dihydro-5-(dimethylaminomethyl)-5H-dibenzo[a,d]cycloheptene
10,11-dihydro-5-(dimethylaminomethyl)-3-tertiarybutyl-5H-dibenzo[a,d]cycloheptene
10,11-dihydro-5-(dimethylaminomethyl)-2-methyl-5H-dibenzo[a,d]cycloheptene
10,11-dihydro-5-(dimethylaminomethyl)-4-methyl-5H-dibenzo[a,b]cycloheptene.

EXAMPLE 14

*Tablets.*—Tablets for oral administration are prepared by mixing the active ingredient with appropriate amounts of excipients and binding agents, formed into tablets by a conventional tableting machine and coated so that each tablet will have the following composition.

Per tablet, mg.
5-(methylaminomethyl)-5H - dibenzo[a,d]cycloheptene hydrogen maleate _____ 10
Cellulose filter aid _____ 11
Lactose _____ 9
Calcium phosphate dibasic _____ 143
Guar gum _____ 6.1
Corn starch _____ 4
Magnesium stearate _____ 0.9
Opaque yellow film coating _____ 3

EXAMPLE 15

*Capsules.*—Capsules for oral administration are prepared by dispersing the active ingredient in lactose and magnesium stearate and encapsulating the mixture in standard soft gelatin capsules so that each capsule will have the following composition.

Per capsule, mg.
5-(methylaminomethyl)-10,11-dihydro-5H - dibenzo[a,d]cycloheptene hydrochloride _____ 5
Lactose _____ 430
Magnesium stearate _____ 5

EXAMPLE 16

*Parenteral solution.*—A solution suitable for administration for injection is prepared by mixing the active ingredients, Dextrose, methylparaben, propylparaben and distilled water, so that each one will have the following composition, and sterilized.

Per ml., mg.
5-(dimethylaminomethyl) - 5H - dibenzo[a,d]cycloheptene hydrogen maleate _____ 5
Dextrose _____ 44
Methylparaben _____ 1.5
Propylparaben _____ 0.2
Water for injection, q.s.

The preceding three examples, Examples 14, 15 and 16, are repeated, and compositions for the treatment or prevention of arrhythmia are prepared by substituting any of the compounds specifically illustrated above in place of the dibenzocycloheptene as one of the active compounds useful in our invention.

EXAMPLE 17

5-(dimethylaminomethyl)-5H-dibenzo[a,d]cycloheptene-N-oxide

A solution of 6.85 g. (0.0275 mole) of 5-dimethylaminomethyl)-5H-dibenzo[a,d]cycloheptene in 125 ml. of methanol is cooled in ice, stirred, and treated with 6.24 g. (0.055 mole) of 30% hydrogen peroxide. After about 18 hours at room temperature, another 6.24 g. of 30% hydrogen peroxide is added. After about 3 days at room temperature, the excess hydrogen peroxide is destroyed by stirring the mixture with a suspension of 150 mg. of 10% palladium on charcoal in 3 ml. of water for about 16 hours. The solution is filtered and the filtrate evaporated under reduced pressure below 35° C. The oily residue is dried in a vacuum desiccator over phosphorus pentoxide until it is semisolid and then crystallized from ethanol-ether to yield the base, M.P. 93–94° C. Recrystallization from ethanol-ether gives material melting at 94.5–95.5° C. after drying at 0.1 mm. at room temperature. This base is converted to the hydrochloride salt by treating an ethanolic solution with a slight excess of ethanolic hydrogen chloride. Dilution with ether precipitates the product, M.P. 164–166° C. Recrystallization from ethanol-ether gives an analytical sample, M.P. 170–171.5° C.

*Analysis.*—Calcd. for $C_{18}H_{19}NO \cdot HCl$ (percent): C, 71.63; H, 6.68; N, 4.64. Found (percent): C, 71.72; H, 6.50; N, 4.60.

EXAMPLE 18

5-(isopropylaminomethyl)-5H-dibenzo[a,d]cycloheptene

N-isopropyl-5H-dibenzo[a,d]cycloheptene - 5 - carboxamide.—5H-dibenzo[a,d]cycloheptene-5 - carboxylic acid chloride, 5.1 g. (0.02 mole), in 80 ml. of dry benzene is added dropwise to 20 ml. of isopropylamine and the mixture is stirred at reflux for 2 hours. The cooled solution is washed with water, dilute hydrochloric acid, and water and dried over anhydrous sodium sulfate. Evaporation of the benzene under reduced pressure leaves the product as the solid residue, M.P. 160–161°. The melting point is unchanged by recrystallization from aqueous ethanol and sublimation at 125° and 0.05 mm.

*Analysis.*—Calcd. for C₁₉H₁₉NO (percent): C, 82.28; H, 6.91; N, 5.05. Found (percent): C, 82.55; H, 6.89; N, 5.05.

5-(isopropylaminomethyl) - 5H - dibenzo[a,d]cycloheptene.—Lithium aluminum hydride, 1.42 g. (0.04 mole) is weighed under nitrogen, transferred to a dry, nitrogen-flushed reaction vessel, and suspended in 50 ml. of absolute ether. A solution of 5.35 g. (0.04 mole) of aluminum chloride in 75 ml. of absolute ether is added dropwise. A white precipitate separates. A solution of 2.77 g. (0.01 mole) of N-isopropyl-5H-dibenzo[a,d]-cycloheptene - 5-carboxamide in 500 ml. of absolute ether is added rapidly dropwise and the mixture is stirred at reflux for 6 hours and at room temperature for about 16 hours. After cooling in ice, the mixture is hydrolyzed by the dropwise addition of 25 ml. of water. The ethereal layer is decanted from the white gelatinous precipitate that separates. The precipitate is re-extracted with two portions of ether and then stirred with 500 ml. of 10% aqueous sodium hydroxide. The mixture is extracted with three portions of 1:1 benzene-ether and the combined extracts are washed with water and dried over anhydrous magnesium sulfate. Evaporation of solvents under reduced pressure leaves the product as the oily residue. A solution of the base in absolute ether is treated with a slight excess of maleic acid dissolved in ethanol and the hydrogen maleate salt precipitates; M.P. 189–191° C. dec. Repeated recrystallizations from ethanol-ether give the analytical sample, M.P. 193–195° C. dec.

*Analysis.*—Calcd. for C₁₉H₂₁N·C₄H₄O₄ (percent): C, 72.80; H, 6.64; N, 3.69. Found (percent): C, 73.02; H, 6.61; N, 3.66.

We claim:

1. A method for treating cardiac arrhythmia in animals which comprises administering to an afflicted animal an antiarrhythmia dose of an active compound having the formula:

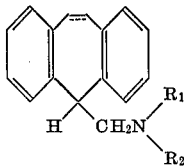

or a pharmaceutically-acceptable salt thereof, wherein R₁ and R₂ are hydrogen or loweralkyl, or a derivative thereof in which one or more of the hydrogen atoms attached to the 1, 2, 3, 4, 6, 7, 8 or 9 positions is replaced by halogen, alkyl having from 1–6 carbon atoms, trifluoromethyl, alkylsulfonyl having from 1–5 carbon atoms, alkylmercapto having from 1–5 carbon atoms, or dialkylsulfamoyl having from 1–4 carbon atoms and the dotted line joining the two carbons is optionally an additional bond.

2. A method according to claim 1 wherein the compound administered is a compound of the formula:

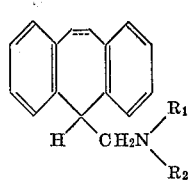

wherein R₁ and R₂ are loweralkyl or a pharmaceutically-acceptable salt of said compound.

3. A method for treating cardiac arrhythmia in animals in accordance with claim 1 where the dose of active compound administered is from 0.1 mg. to 1000 mg./kg. of body weight of the affected animal on a daily basis.

4. A method according to claim 1 wherein the compound administered is a compound of the formula

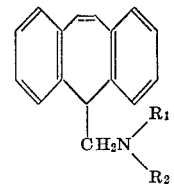

wherein R₁ and R₂ are H or lower alkyl substituents and the dotted line defines an optional additional bond.

5. A method according to claim 4 wherein the compound administered is a compound of the formula

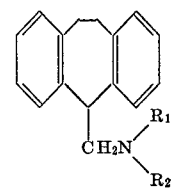

wherein R₁ and R₂ are H or lower alkyl.

6. A method according to claim 4 wherein the compound administered is a compound of the formula

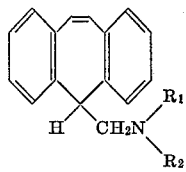

wherein R₁ and R₂ are H or lower alkyl.

7. A method according to claim 5 wherein the compound administered is a compound of the formula

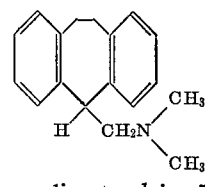

8. A method according to claim 5 wherein the compound administered is a compound of the formula

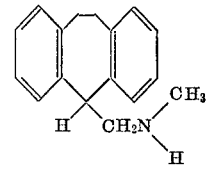

9. A method according to claim 6 wherein the compound administered is a compound of the formula

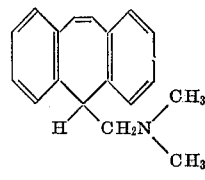

10. A method according to claim 6 wherein the compound administered is a compound of the formula

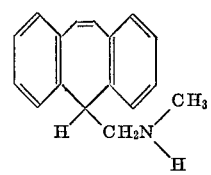

11. A method for treating cardiac arrhythmia in animals which comprises administering to an afflicted animal and antiarrhythmia dose of an active compound having the formula:

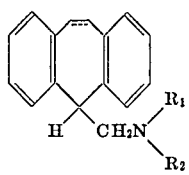

or a pharmaceutically acceptable salt thereof wherein $R_1$ and $R_2$ are hydrogen or loweralkyl, or a derivative thereof in which one or more of the hydrogen atoms attached to the 1, 2, 3, 4, 6, 7, 8 or 9 positions is replaced by halogen, alkyl having from 1-6 carbon atoms, trifluoromethyl, alkylsulfonyl having from 1-5 carbon atoms, alkylmercapto having from 1-5 carbon atoms, or dialkylsulfamoyl having from 1-4 carbon atoms and in which one of the hydrogen atoms attached to the 10 or 11 positions is replaced by chlorine or bromine.

References Cited

Derwert Farm Doc. No. 21,943, NE. 65, 17264, published July 1, 1966, pp. 83-93.

ALBERT T. MEYERS, Primary Examiner

J. D. GOLDBERG, Assistant Examiner